(12) United States Patent
Domingues et al.

(10) Patent No.: US 11,229,213 B2
(45) Date of Patent: Jan. 25, 2022

(54) FOOD PROTEIN GEL MATRIX GLUTEN ANALOG

(71) Applicant: General Mills, Inc., Minneapolis, MN (US)

(72) Inventors: David J Domingues, Plymouth, MN (US); Peter J Galuska, Hudson, WI (US)

(73) Assignee: General Mills, Inc., Minneapolis, MN (US)

( * ) Notice: Subject to any disclaimer, the term of this patent is extended or adjusted under 35 U.S.C. 154(b) by 595 days.

(21) Appl. No.: 15/735,668

(22) PCT Filed: Jun. 18, 2015

(86) PCT No.: PCT/US2015/036426
§ 371 (c)(1),
(2) Date: Dec. 12, 2017

(87) PCT Pub. No.: WO2016/204765
PCT Pub. Date: Dec. 22, 2016

(65) Prior Publication Data
US 2018/0360050 A1    Dec. 20, 2018

(51) Int. Cl.
| | |
|---|---|
| *A21D 2/18* | (2006.01) |
| *A21D 2/26* | (2006.01) |
| *A21D 10/02* | (2006.01) |
| *A21D 13/066* | (2017.01) |
| *A21D 6/00* | (2006.01) |

(Continued)

(52) U.S. Cl.
CPC ............. *A21D 2/183* (2013.01); *A21D 2/263* (2013.01); *A21D 6/001* (2013.01); *A21D 8/042* (2013.01); *A21D 10/025* (2013.01); *A21D 13/047* (2017.01); *A21D 13/066* (2013.01); *A23V 2002/00* (2013.01)

(58) Field of Classification Search
None
See application file for complete search history.

(56) References Cited

U.S. PATENT DOCUMENTS 4,576,645 A * 3/1986 Ravel ................... A61K 9/0056
106/205.6
5,133,984 A * 7/1992 Murphy ................... A21D 2/18
426/496

(Continued)

FOREIGN PATENT DOCUMENTS

| EP | 2548442 | 1/2013 |
| WO | 89/10068 | 11/1989 |

OTHER PUBLICATIONS

Heck: Enzyme-catalyzed protein crosslinking; Appl Microbiol Biotechnol. Jan. 2013; 97(2): 461-475; Published online Nov. 25, 2012. doi: 10.1007/s00253-012-4569-z (Year: 2012).*

(Continued)

*Primary Examiner* — Patricia A George
(74) *Attorney, Agent, or Firm* — Diederiks & Whitelaw, PLC; John L. Crimmins, Esq.

(57) ABSTRACT

A viscoelastic composition includes a gel matrix comprising hydrated hydrocolloid gel and cross-linked protein, at least one gluten-free flour source, a starch, and a leavener. In some embodiments, the gel matrix imparts gluten-like properties to a gluten-free viscoelastic composition.

21 Claims, 1 Drawing Sheet

Yield Stress Point versus Protein Concentration

(51) Int. Cl.
  *A21D 13/047* (2017.01)
  *A21D 8/04* (2006.01)

(56) References Cited

U.S. PATENT DOCUMENTS

| | | | |
|---|---|---|---|
| 5,403,610 A * | 4/1995 | Murphy | A21D 2/18 426/549 |
| 5,480,662 A * | 1/1996 | Boode-Boissevain | A21D 2/18 426/556 |
| 8,741,369 B2 | 6/2014 | Petrofsky et al. | |
| 2001/0010830 A1 | 8/2001 | Van Eendenburg et al. | |
| 2005/0031733 A1 | 2/2005 | Domingues et al. | |
| 2009/0098270 A1 | 4/2009 | Engleson et al. | |
| 2010/0303997 A1 * | 12/2010 | Fulton | A21D 2/36 426/601 |
| 2012/0027890 A1 | 2/2012 | Cerne | |
| 2012/0207880 A1 | 8/2012 | Shin et al. | |

OTHER PUBLICATIONS

Chen: Microfragmented ionic polysaccharide/protein complex dispersions; WO1989010068; published Nov. 2, 1989. (Year: 1989).*

Han: Development of gluten-free cracker snacks using pulse flours and fractions; Food Research International 43 (2010) 627-633. (Year: 2010).*

Sivan: Properties of Bread Dough with Added Fiber Polysaccharides and Phenolic Antioxidants: A Review; J Food Sci. Oct. 2010; 75(8): R163-R174, doi: 10.1111/j.1750-3841.2010.01815.x (Year: 2010).*

Huebner: Polysaccharide Interactions With Wheat Proteins and Flour Doughs; Cereal Chemistry: vol. 56, No. 2, 1979 (Year: 1979).*

Glucomannan, retrieved from the Internet Feb. 26, 2020: http:www.konjacfoods.com/gum.htm.

* cited by examiner

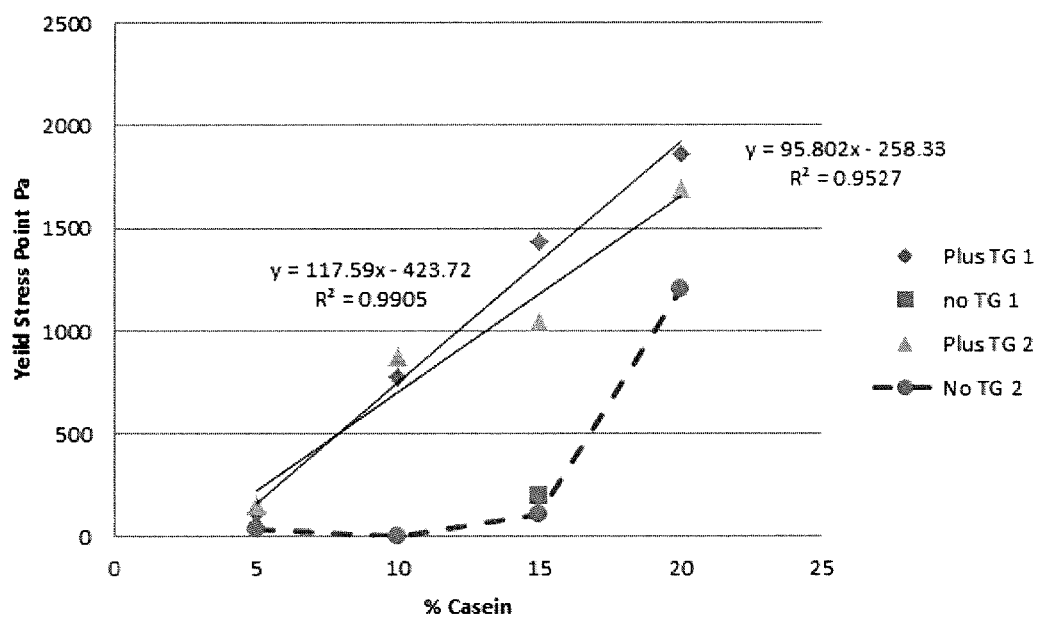
Yield Stress Point versus Protein Concentration

FOOD PROTEIN GEL MATRIX GLUTEN ANALOG

CROSS-REFERENCE TO RELATED APPLICATIONS

The present application represents a National Stage application of PCT/US2015/036426 entitled "Food Protein Gel Matrix Gluten Analog", filed Jun. 18, 2015. The entire contents of this application is incorporated herein by reference.

BACKGROUND

Gluten is a protein found in a variety of grains including wheat, rye, and barley, with wheat containing the highest levels of gluten when compared to other cereal grains. Although wheat flour is typically referred to as containing gluten, in reality, wheat flour contains two proteins, gliadin and glutenin, which when hydrated combine to form gluten.

Gluten is responsible for the texture and taste of wheat flour-based baked goods such as breads. Upon hydration, gluten forms a network of fine strands that give the dough structure and the capacity to stretch and/or rise during baking. The elasticity of gluten enables the dough to trap gases, which create open cellular structures upon baking.

Gluten also affects the viscosity of dough. As described above, gluten forms the structure of the dough. The extent of the network of gluten strands impacts whether a mixture is thin and runny, like a batter, or is thick, like a dough.

Some individuals are sensitive or intolerant to gluten. Recently there has been a growing trend to provide gluten-free baked goods. While consumers are demanding gluten-free products, it is very difficult to produce gluten-free products having a similar taste and texture as traditional gluten and/or wheat flour containing products because, as described above, gluten provides the structure or framework for traditional baked goods. When wheat flour is replaced with a gluten-free flour, such as rice flour, the dough lacks a matrix to create the structure and texture typically associated with comparable gluten containing baked goods. For example, gluten-free dough may not have the same elasticity as a gluten dough, may be drier or wetter and more difficult to handle, and may not rise or expand to the same degree during baking. There is a demand for gluten-free baked goods having a taste and/or texture more similar to that of gluten baked goods.

Additionally, consumers enjoy the modern convenience of ready-to-bake products which can go directly from the pantry, refrigerator or freezer to the oven or other associated baking appliance without the need for additional preparation steps and/or the addition of ingredients. Particularly, there is demand for ready-to-bake gluten-free products that can go directly from the refrigerator to the oven or other associated baking appliance.

SUMMARY

In a first example, a viscoelastic composition includes a gel matrix comprising hydrated hydrocolloid gel and cross-linked protein, at least one gluten-free flour source, a starch, and a leavener.

In a second example, an edible continuous phase composition includes at least one edible hydrated hydrocolloid gel and cross-linked protein dispersed within the hydrated hydrocolloid gel.

In a third example, a method of making an edible continuous phase composition includes forming a hydrated hydrocolloid gel by combining a hydrocolloid and water, dispersing protein into the hydrated hydrocolloid gel, and cross-linking the dispersed protein within the hydrated hydrocolloid gel.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 illustrates protein gel yield stress point as a function of protein.

DETAILED DESCRIPTION

The current invention relates to an edible continuous phase composition or gel matrix, which may be incorporated into a gluten-free dough, such as a gluten-free dough or batter. In some embodiments, the gel matrix may impart one or more gluten-like characteristics to the gluten-free dough. For example, the gel matrix may impart mouth-feel, viscosity and/or elasticity properties to the gluten-free dough or batter similar to that of a gluten containing composition.

The edible continuous phase composition includes at least one edible hydrated hydrocolloid gel and a cross-linked protein. In some embodiments, the hydrated hydrocolloid gel and the cross-linked protein may form a gel matrix, which may function similarly to the matrix formed by gluten. Hydrocolloids are hydrophilic polymers that contain hydroxyl groups and may be polyelectrolytes. Suitable hydrocolloids may be of vegetable, animal, microbial or synthetic origin.

A hydrated hydrocolloid gel is a mixture containing soluble hydrocolloid particles suspended throughout water. In some embodiments, a hydrated hydrocolloid gel may be formed by combining or dispersing one or more hydrocolloids in water to form a suspension in the water. Suitable edible hydrated hydrocolloid gels include konjac gum, xanthan gum, and combinations thereof. Other suitable thermal reversible food gels include carrageenan, gelatin, methyl cellulose, various starch gels, gellan gum, and low-pH calcium-set low-methoxy pectin gels.

A hydrated hydrocolloid gel does not flow at steady-state. In some embodiments, a suitable hydrated hydrocolloid gel may have a viscosity of about 20,000 centipoise (cP) to about 100,000 cP at 30° C. For example, a 1 wt % konjac gum in water mixture typically has a viscosity of about 20,000 cP to about 40,000 cP at 30° C. In some embodiments, konjac gum may interact synergistically with carrageenan, xanthan gum, locust bean gum (LBG) and starch. For example, the addition of 0.02-0.03 wt. % konjac gum to 1 wt % xanthan gum will raise the viscosity of the system by 2-3 times under heat. Previous data suggests that a maximum gel strength of konjac-xanthan gels are achieved at a weight ratio of konjac to xanthan from 1:2.5 to 1:4.

In some embodiments, the hydrated hydrocolloid gel may be thermoreversible. For example, the hydrated hydrocolloid gel may be capable of repeatedly transitioning between a gel and a fluid. This is particularly useful in food applications where it is desired to render the product rheological stable at refrigeration temperatures while being able to experience a change in viscosity upon heating during baking, for example to thereby enable the product to flow and expand to a larger volume.

The edible continuous phase composition also includes a cross-linked protein which is dispersed in the hydrated hydrocolloid gel. The cross-linked protein is present in amount such that the edible continuous phase composition has a suitable viscosity. In some embodiments, suitable amounts of the cross-linked protein include an amount as little as 0.001%, 0.01%, 1% or as great as 5%, 10% or 25% by weight of edible continuous phase composition or by a range defined by any pair of the foregoing values. For example, the cross-linked protein may be present in an amount of 25% or less, 10% or less, or 5% or less by weight of the edible continuous phase composition.

The cross-linked protein may include a covalent bond or attachment between two molecules or groups on a single protein resulting in an intramolecular crosslink that may stabilize the tertiary or quaternary structure of the protein. Additionally or alternatively, the cross-linked protein may include a covalent bond or attachment between two molecules or groups on two different proteins resulting in an intermolecular crosslink that may stabilize protein-protein interaction. In some embodiments, protein cross-linking gives rise to new macromolecular assemblies which may have properties and functionalities different than those of the sole or individual proteins.

The cross-linked protein may include glutamine or a derivative thereof. In some embodiments, the cross-linked protein may include two or more different proteins. For example, in some embodiments, the cross-linked protein may include a first protein with a glutamine side chain and second protein with a lysine side chain, and the first and second proteins may be bonded at the glutamine side chain and the lysine side chain. In some embodiments, suitable proteins include sodium casein, whey protein and combinations thereof.

The protein may be cross-linked enzymatically. For example, the protein may be cross-linked by exposing the protein to a cross-linking enzyme dispersed in water, such as the water of the hydrated hydrocolloid gel. The cross-linking enzyme catalyzes a reaction between two groups of the target protein(s). For example, the cross-linking enzyme may catalyze the formation of an isopeptide between an epsilon amine of the protein or peptide bound lysine and the acyl group from the side chain of the protein or peptide bound glutamine. In some embodiments, a suitable cross-linking enzyme is transglutaminase.

The edible continuous phase composition may be formed by combining a hydrocolloid with water to form a hydrated hydrocolloid gel, dispersing protein in the gel, and cross-linking the protein. The hydrocolloid and water are combined in suitable amounts to form a gel. For example for a konjac/xanthan gel, suitable amounts of konjac gum to xanthan gum including 1:1 to 1:5 parts by weight at 1% to 3% by weight total gum to water.

Depending on the hydrocolloid, the water may be at room temperature, above room temperature or below room temperature when combined with the hydrocolloid. In some embodiments, mixing the hydrocolloid with water at a temperature above room temperature may improve hydration.

In some embodiments, two or more different hydrocolloids may be combined with water to form a hydrated hydrocolloid gel. For example, two or more hydrocolloids may be hydrated together or simultaneously in water. For example, konjac gum and xanthan gum may be hydrated simultaneously together in water. Alternatively, two or more hydrocolloids may be hydrated separately and then combined. For example, in some embodiments, the order of addition of the hydrocolloid system affects solubility and/or stability. In these embodiments, the typical hydration process for the specific hydrocolloid system may be followed. For example, for a system including calcium set alginate gel, the alginate may be hydrated prior to adding calcium to the system to set.

Protein may be dispersed into the hydrated hydrocolloid gel. In some embodiments, the protein may be native protein that has no additional enzymatic cross-linking prior to addition to the hydrated hydrocolloid gel. Native protein may naturally include some cross-linked structure. As used herein native protein refers to protein which has not been subject to an enzymatic cross-linking process.

The protein may be mixed or distributed within the hydrated hydrocolloid gel. In some embodiments, two or more different proteins may be dispersed into the hydrated hydrocolloid gel. The protein may be mixed or dispersed within the hydrated hydrocolloid gel to uniformly distribute the protein within the hydrocolloid gel.

The protein may be cross-linked upon dispersion in the hydrated hydrocolloid gel. For example, the protein may be cross-linked enzymatically with one or more cross-linking enzymes during or after dispersion in the hydrated hydrocolloid gel. In some embodiments, the cross-linking enzyme may be added to the water either before or after the water is combined with the hydrocolloid and before protein is dispersed in the hydrated hydrocolloid gel. For example, the cross-linking enzyme may be present in the hydrated hydrocolloid gel when the protein is dispersed therein.

In some embodiments, cross-linking of the protein occurs when the cross-linking enzyme contacts the protein. For example, cross-linking may occur upon dispersion of the protein within the hydrated hydrocolloid gel containing the cross-linking enzyme. The rate of cross-linking may be adjusted or varied. In some embodiments, the rate of cross-linking may be increased or decreased by increasing or decreasing the temperature at which the cross-linking occurs. Additionally or alternatively, the rate of cross-linking may be adjusted by increasing or decreasing the amount of protein dispersed within the hydrated hydrocolloid gel and/or by increasing the concentration of cross linking enzyme present in the hydrocolloid gel matrix.

In some embodiments, the edible continuous phase composition is a gel matrix which may be incorporated into an edible viscoelastic composition, such a gluten-free dough or batter. In some embodiments, viscoelastic composition may include the gel matrix described herein having a hydrated hydrocolloid gel and cross-linked protein; at least one gluten-free flour source; a starch; and a leavener. In some embodiments, the one gluten-free flour source, starch, leavener and optional additional ingredients may be combined in suitable amounts to create a gluten-free dough or batter. Gluten-free doughs and batters according to embodiments of the present invention contain less than 20 ppm gluten and more particularly 0% by weight of gluten. In some embodiments, gluten content may be determined by the gliadin content. A suitable method for determining the gluten content of a food product is provided in Association of Analytical Communities (AOAC) Official Method 991.19: Gliadin as a Measure of Gluten in Foods (final action 2001). As described herein, in some embodiments, the gel matrix may impart viscosity and/or elasticity to the dough. Additionally or alternatively, in some embodiments, the gel matrix may impart structure to the baked good.

In some embodiments, the gel matrix may be uniformly dispersed throughout the composition to form a uniform dough. For example, the gel matrix and the gluten-free flour source may be uniformly dispersed throughout the composition and the gluten-free flour source may be uniformly dispersed within the gel matrix.

In other embodiments, the viscoelastic composition may include discrete layers, such as laminated layers, of the gel matrix and the dough. For example, the viscoelastic composition may include alternating layers of the gel matrix and the dough. In some embodiments, a viscoelastic composition including discrete dough layers and gel matrix layers may have improved processing rheological properties and improved gas entrapment during baking and may produce a baked product having greater expansion than a similar composition without the laminated layers and/or without the gel matrix.

In some embodiments, the gluten-free flour may be present in the viscoelastic composition in an amount from about 12.5% to about 35% by weight of the composition. The gluten-free flour mixture may include, consist essentially of or consist of rice flour, sorghum flour, quinoa flour, soya flour, oat flour, amaranth flour, buckwheat flour, corn flour, millet, potato flour, teff flour, various legume flours and combinations thereof.

The composition may also include a starch. Suitable starches include potato starch, tapioca starch, corn starch, teff starch, oat starch, sorghum starch, amaranth starch, buckwheat starch, millet starch, and combinations thereof. In some embodiments, the starch may provide additional structural and textural properties that the gluten-free flour alone cannot accomplish. Suitable amounts of total starch include from about 1% starch by weight of the composition to about 30% starch by weight of the composition, and more particularly from about 4% starch by weight of the composition to about 23% starch by weight of the composition.

The dough may also include a leavener. In some embodiments, the leavener is a leavening system, such as an acid and a base that can react to form carbon dioxide. Suitable leavening systems may include baking soda (sodium bicarbonate or potassium bicarbonate), monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-deltalactone (GDL), potassium hydrogen tartrate (cream of tartar), sodium bicarbonate and the like. Baking soda is a leavening base and is the primary source of carbon dioxide in many chemical leavening systems. This compound is stable and relatively inexpensive to produce. Baking soda can be used in either an encapsulated form or in a non-encapsulated form. Use of an encapsulated baking soda delays the onset of the leavening reaction as the encapsulating material must first be dissolved or dispersed before the leavening reaction can occur. In some embodiments, the composition may include from about 0.2% to about 1.5% of a leavening system, such as baking soda, by total formula weight, and more particularly from about 0.4% to about 1.0%. Additionally or alternatively, the dough may include baking yeast to ferment naturally occurring and added sugars to produce leavening carbon dioxide gas and ethanol.

In some embodiments, the viscoelastic composition may further include a lipid such as oil, shortening, fat or butter. Suitable lipids include but are not limited to canola oil, cottonseed oil, nut oil, soybean oil, sunflower oil, rapeseed oil, sesame oil, olive oil, corn oil, safflower oil, palm oil, palm kernel oil, coconut oil, and combinations thereof. In some embodiments, the lipid may be added as solid shortening, such as an animal or vegetable based natural shortening or a synthetic shortening. In some embodiments, suitable amounts of lipids include 2% to 15% by weight of the composition. In some embodiments, the lipid may have beneficial effects on the volume, grain and texture of the dough, as well as the texture, mouth feel and other organoleptic properties of the baked product.

In some embodiments, the one or more lipids may be uniformly dispersed through the composition. In other embodiments, one or more lipids may be formed as a separate layer. For example, when the viscoelastic composition is a laminated or layered composition, the composition may include discrete layers of at least one lipid layer, one dough layer and one gel matrix layer. In some embodiments, a lipid layer may be positioned between a dough layer and a gel matrix layer.

In some embodiments, the viscoelastic composition may be a refrigerated dough or batter and the viscoelastic composition may have a suitable storage stability. Storage stability may, for example, include some or all of: freshness of the dough during refrigerated storage as measured by coloration, flavor, physical stability (i.e., no phase separating during storage; desired rheology such as yield point and flowability), organoleptic properties, cooking properties (i.e., leavening), and resistance to microbial growth.

In other embodiments, the viscoelastic composition may be a frozen dough or batter and the viscoelastic composition may have a suitable storage stability.

The viscoelastic composition may be stored in a container of any desired shape and/or size. In some embodiments, the viscoelastic composition may be stored in a tub with snap on lid made of a material such as polypropylene, linear low density polypropylene, or other suitable material. The containers need not be hermetically sealed or pressurized to provide the dough with good microbial stability under refrigeration temperatures. A shrink band may be included to provide evidence of tampering.

Yield strength (yield stress point) is a value that may be used as a physical measurement to describe a material, and specifically the ability of a material to flow. In food products, yield stress may be used to characterize stability, mouth feel, pourability, stability and/or processability. Yield strength of a material is often defined as the stress at which a material begins to deform plastically. Prior to the yield stress point the material will deform elastically and will return to its original shape when the applied stress is removed. Once the yield stress point is passed, some fraction of the deformation will be permanent. As described herein yield stress point is the amount of stress required to initiate dough movement, and can be measured at 4° C. using a Thermo Scientific HAAKE Viscotester VT550.

In some embodiments, the yield stress point of the edible continuous phase composition may increase approximately linearly over the protein concentration. For example, a linear line fit to the yield strength point as a function of protein concentration may have a coefficient of determination ($r^2$) of at least 0.9 or at least 0.95.

As described herein, gluten is responsible for the texture and taste of gluten-based baked goods. Specifically, upon hydration, gluten forms a network or matrix of strands that gives the dough structure and capacity to stretch and/or rise during baking.

In some embodiments, the hydrated hydrocolloid gel is a carrier for cross-linked protein and creates an elastic protein network similar to that of a gluten network. For example, in some embodiments, a dough or dough containing compositing including the hydrated hydrocolloid gel and cross-linked protein has a viscosity and/or elasticity similar to a gluten containing dough. Additionally or alternatively, in some embodiments, a dough or dough containing compositing including the hydrated hydrocolloid gel and cross-linked protein may rise or expand similar to a gluten containing dough and may result in a baked good having a texture, mouth feel or other organoleptic properties of a gluten containing baked good.

In some embodiments, the cross-linking increases the yield stress of the hydrated hydrocolloid gel at low protein concentrations. The increased yield stress suggests improved processability. The increased yield stress enables a lower amount of protein to be used to achieve the same processability of the hydrated hydrocolloid gel and in some embodiments, of a composition containing the hydrated hydrocolloid gel.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims. Unless otherwise noted, all parts, percentages, and ratios reported in the following examples are on a weight basis.

Enzymatic cross-linked hydrated hydrocolloid gel systems containing varying amounts of sodium casein were prepared and compared to hydrated hydrocolloid gel systems that were not enzymatically cross-linked. Each system was prepared by combining konjac gum, xanthan gum and water to form a konjac/xanthan gel matrix. Sodium casein was combined with the gel matrix in varying amounts. For the enzymatic cross-linked hydrated hydrocolloid gel systems, transglutaminase was added.

The yield strength of each sample was determined at approximately 4° C. (40° F.) with a Thermo Scientific HAAKE Viscotester 550 equipped with vane rotor FL100 (immersion sensor with a star configuration). The yield strength results are presented in FIG. 1, where:

| Sample | Description |
| --- | --- |
| Plus TG 1 | Enzymatic cross-linked hydrated hydrocolloid gel system |
| No TG 1 | Hydrated hydrocolloid gel system (not enzymatic cross-linked) |
| Plus TG 2 | Enzymatic cross-linked hydrated hydrocolloid gel system |
| No TG 2 | Hydrated hydrocolloid gel system (not enzymatic cross-linked) |

The experiments demonstrate that in the absence cross-linking, the yield stress point does not increase until the concentration of the protein is high enough for entanglement (i.e., at approximately 15 weight percent casein). In comparison, the yield stress point of an enzymatic cross-linked hydrated hydrocolloid gel system increased linearly with protein concentration. As shown in FIG. 1, a higher yield stress point at lower protein usage is obtained with an enzymatic cross-linked hydrated hydrocolloid gel system.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A viscoelastic composition comprising:
an edible continuous phase composition including
at least one edible hydrated hydrocolloid gel; and
cross-linked protein dispersed within the hydrated hydrocolloid gel, wherein the cross linked protein is selected from the group consisting of sodium casein, whey protein isolate and combinations thereof.

2. The viscoelastic composition of claim 1 wherein the hydrated hydrocolloid gel comprises xanthan gum.

3. The viscoelastic composition of claim 1 wherein the hydrated hydrocolloid gel has a viscosity which is from about 20,000 centipoise (cP) to about 100,000 cP at 30° C.

4. The viscoelastic composition of claim 1 wherein yield stress point of the edible continuous phase composition increases approximately linearly over the cross-linked protein concentration.

5. The viscoelastic composition of claim 1 wherein the hydrocolloid gel is thermoreversible.

6. The viscoelastic composition of claim 1 wherein the cross-linked protein is an enzymatically cross-linked protein.

7. The viscoelastic composition of claim 1 wherein the cross-linked protein is present in an amount of less than 25% by weight of the edible continuous phase composition.

8. The viscoelastic composition of claim 1 wherein the cross-linked protein is present in an amount of less than 10% by weight of the edible continuous phase composition.

9. The viscoelastic composition of claim 1 wherein the cross-linked protein includes an intramolecular crosslink between at least two molecules or groups on a single protein and/or an intermolecular crosslink between at least two molecules or groups on two different proteins.

10. A viscoelastic composition comprising:
an edible continuous phase composition including
at least one edible hydrated hydrocolloid gel, wherein the hydrated hydrocolloid gel comprises konjac gum; and
cross-linked protein dispersed within the hydrated hydrocolloid gel.

11. The viscoelastic composition of claim 10 wherein the edible continuous phase composition is a gel matrix and the viscoelastic composition further comprises:
at least one gluten-free flour source;
a starch; and
leavener.

12. The viscoelastic composition of claim 11 wherein the at least one gluten-free flour source is uniformly dispersed within the gel matrix.

13. The viscoelastic composition of claim 11 wherein the composition is a laminated dough comprising:
a gluten-free dough layer comprising the at least one gluten-free flour source, the starch and the leavener; and
a gel matrix layer comprising the gel matrix positioned on the gluten-free dough layer.

14. The viscoelastic composition of claim 13 wherein the gluten-free dough layer includes at least one lipid selected from the group consisting of oil, shortening, fat, butter and combinations thereof.

15. The viscoelastic composition of claim 13 and further comprising a lipid-containing layer positioned between the gluten-free dough layer and the gel matrix layer.

16. The viscoelastic composition of claim 11 wherein the cross-linked protein is selected from the group consisting of sodium casein, whey protein isolate and combinations thereof.

17. The viscoelastic composition of claim 10, wherein the hydrated hydrocolloid gel has a viscosity from about 20,000 centipoise (cP) to about 100,000 cP at 30° C.

18. A method of making a viscoelastic composition comprising: making an edible continuous phase composition, wherein making an edible continuous phase composition includes forming at least one edible hydrated hydrocolloid gel by combining a hydrocolloid and water; dispersing protein into the hydrated hydrocolloid gel; and cross-linking the dispersed protein within the hydrated hydrocolloid gel, wherein the method further comprises at least one of:

the hydrated hydrocolloid gel comprises konjac gum; and the cross linked protein is selected from the group consisting of sodium casein, whey protein isolate and combinations thereof.

19. The method of claim 18, wherein forming at least one edible hydrate hydrocolloid gel includes adding cross-linking enzyme to the water.

20. The method of claim 19 wherein forming at least one edible hydrate hydrocolloid gel includes adding transglutaminase to the water.

21. The method of claim 18, wherein cross-linking the dispersed protein comprises enzymatically cross-linking the dispersed protein within the hydrated hydrocolloid gel.

* * * * *